United States Patent [19]

Kim

[11] Patent Number: 5,194,190

[45] Date of Patent: Mar. 16, 1993

[54] PROCESS FOR IMPREGANTION OF GLASS FIBER REINFORCEMENT WITH THERMOPLASTIC RESINS

[75] Inventor: Bang M. Kim, Schenectady, N.Y.

[73] Assignee: General Electric Company, Schenectady, N.Y.

[21] Appl. No.: 331,199

[22] Filed: Mar. 31, 1989

[51] Int. Cl.$^5$ ............................................. B29C 43/52
[52] U.S. Cl. .................................... 264/25; 264/27; 264/173; 264/258; 264/325
[58] Field of Search ...................... 264/25, 26, 27, 173, 264/257, 258, 510, 511, 512, 135, 136, 137, 129, 320, 325

[56] References Cited

U.S. PATENT DOCUMENTS

| | | | |
|---|---|---|---|
| 2,407,833 | 9/1946 | Jablonsky | 154/126 |
| 2,564,397 | 8/1951 | Duddy | 264/26 |
| 3,000,772 | 9/1961 | Lunn | 154/52.5 |
| 3,077,428 | 2/1963 | Heuser et al. | 154/50 |
| 3,082,144 | 3/1963 | Haley | 156/244 |
| 3,233,013 | 2/1966 | Von Jaeger | 264/26 |
| 3,444,275 | 5/1969 | Willett | 264/102 |
| 3,470,055 | 9/1969 | Wade | 156/244 |
| 3,472,729 | 10/1969 | Sterman et al. | 161/93 |
| 3,532,779 | 10/1970 | Wienand | 264/257 |
| 3,684,645 | 8/1972 | Temple | 264/257 |
| 3,791,906 | 2/1974 | Farkas | 264/26 |
| 4,186,044 | 1/1980 | Bradley et al. | 156/273 |
| 4,201,612 | 5/1980 | Figge | 264/257 |
| 4,201,823 | 5/1980 | Russell | 264/257 |
| 4,270,964 | 6/1981 | Flaskett | 264/102 |
| 4,287,014 | 9/1981 | Gaku et al. | 156/306.9 |
| 4,288,399 | 9/1981 | Siedenstrang et al. | 264/25 |
| 4,350,545 | 9/1982 | Garabedian | 264/102 |
| 4,396,566 | 8/1983 | Brinkmann | 264/257 |
| 4,469,543 | 9/1984 | Segal et al. | 156/283 |
| 4,478,771 | 10/1984 | Schreiber | 264/25 |
| 4,512,942 | 4/1985 | Babbin et al. | 264/26 |
| 4,622,091 | 11/1986 | Letterman | 156/286 |
| 4,716,072 | 12/1987 | Kim | 428/212 |
| 4,741,873 | 5/1988 | Fischer et al. | 264/25 |
| 4,765,942 | 8/1988 | Christensen | 264/510 |
| 4,840,758 | 6/1989 | Thorsrud | 264/26 |
| 4,859,524 | 8/1989 | Kim et al. | 428/236 |
| 4,943,224 | 7/1990 | Nied et al. | 264/26 |

FOREIGN PATENT DOCUMENTS

| | | | |
|---|---|---|---|
| 644814 | 7/1962 | Canada | 154/71 |
| 0195561 | 9/1986 | European Pat. Off. | 264/511 |
| 3536272 | 4/1987 | Fed. Rep. of Germany | |
| 77527 | 11/1980 | Japan | |
| 209829 | 11/1984 | Japan | |

Primary Examiner—Tim Heitbrink
Attorney, Agent, or Firm—Patrick R. Scanlon; Paul R. Webb, II

[57] ABSTRACT

A process for impregnating a glass fiber mat with a resin, and for producing composite structures having impregnated glass fibers, is provided which substantially reduces the number of voids in the resulting structure, provides fast and efficient heating of the materials, and requires low capital cost equipment to perform the process. The process includes heating a glass fiber mat and an RF-sensitive resin in a radio frequency electromagntic field to quickly heat the mat and resin, the resin flowing into voids in the glass fiber mat, thereby impregnating the mat; forming the resulting composite structure into a desired end shape; and cooling the structure. Reduction in the number of voids is advantageously accomplished by impregnating the resin into the mat under vacuum, which removes air and decomposition products which result from the RF heating of the resin. Impregnation, molding of the shape, and cooling of the structure may all be performed in a mold if desired, and elongated profiled parts may be continuously produced from elongated sheet stock by passing the heated structure through roll forming dies.

25 Claims, 6 Drawing Sheets

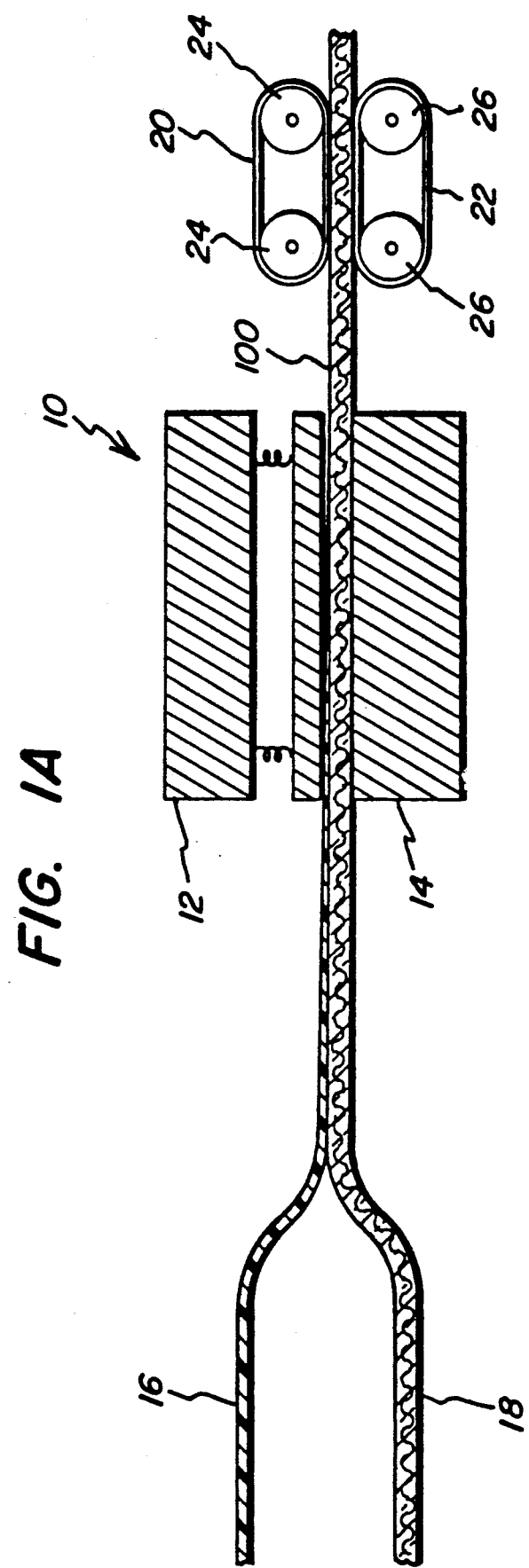

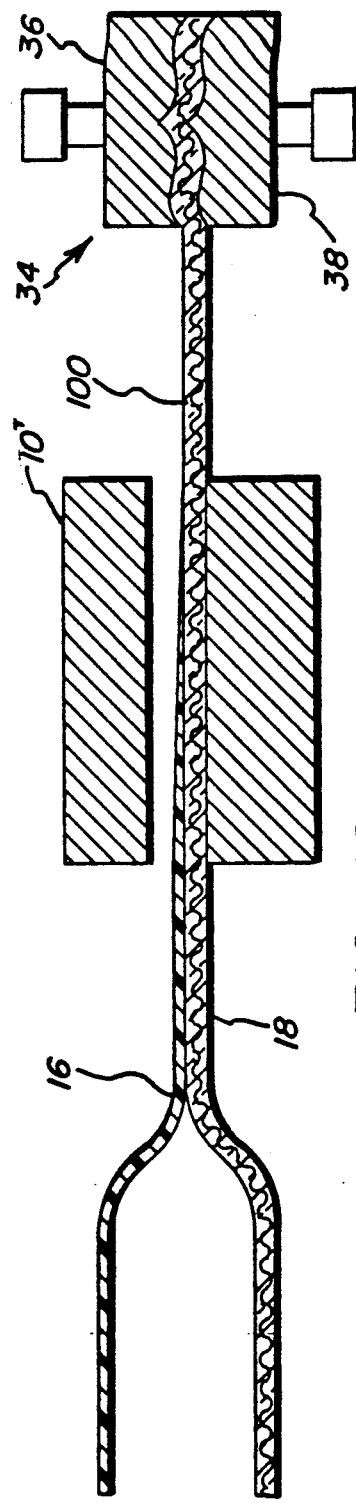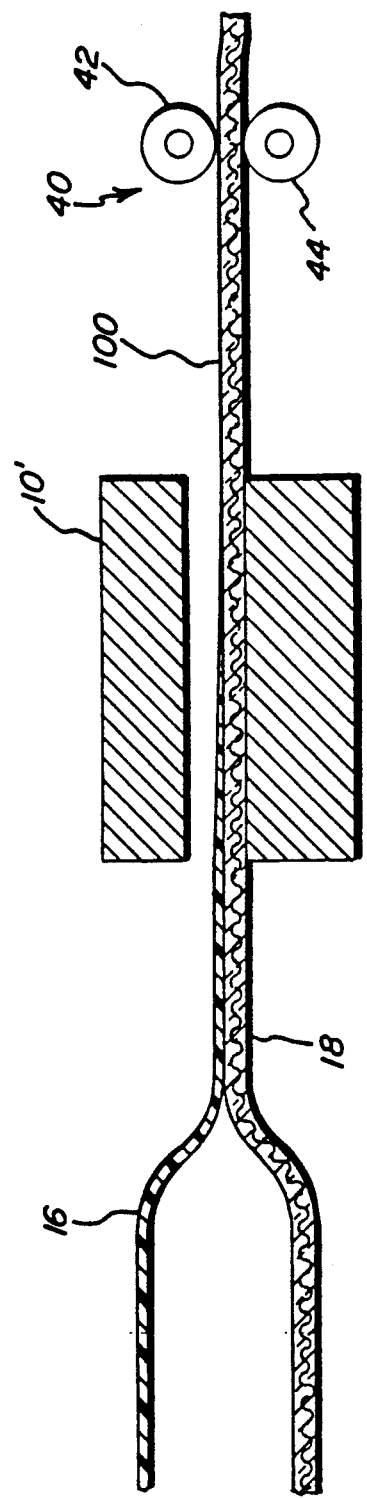

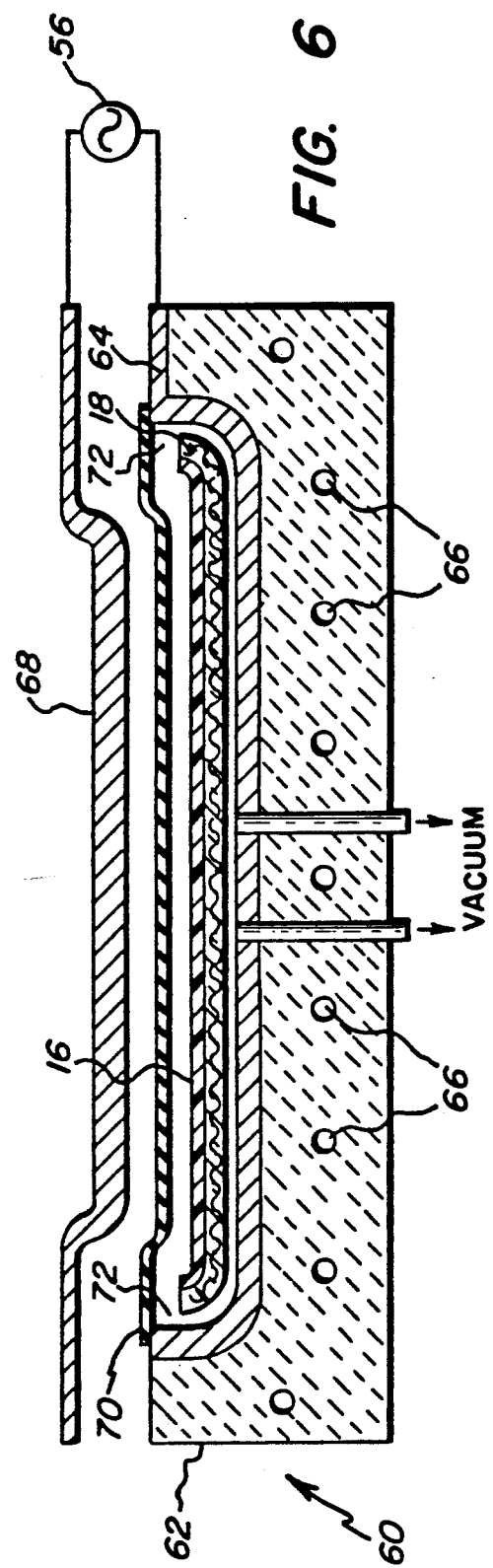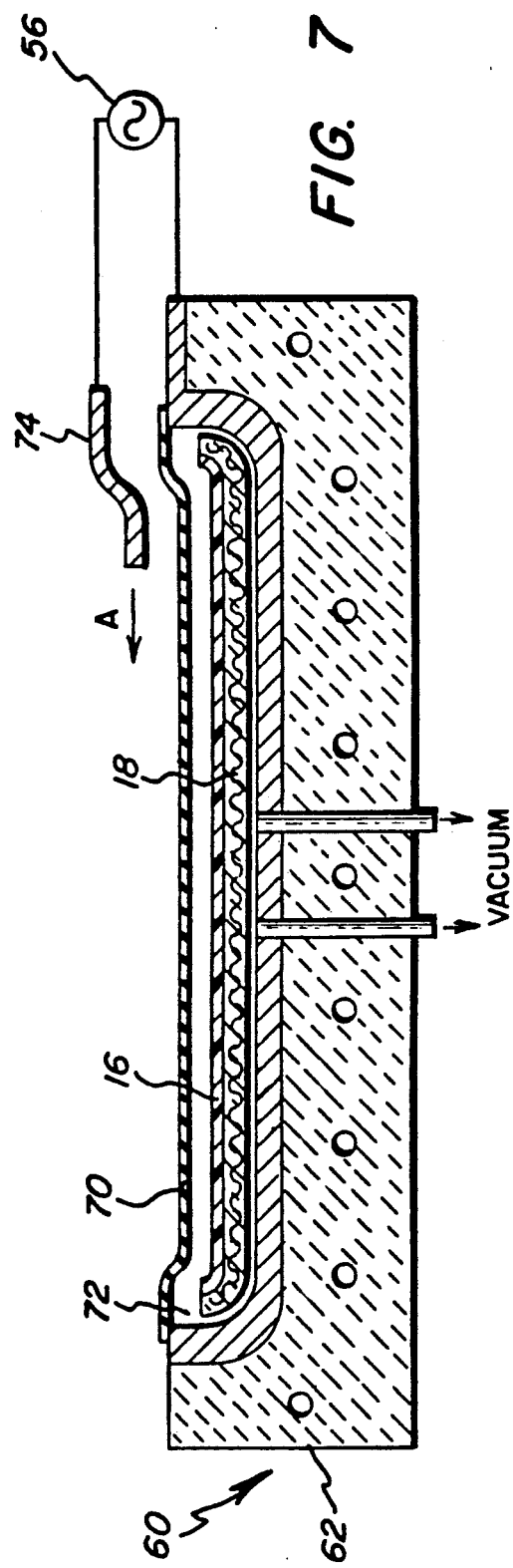

PROCESS FOR IMPREGANTION OF GLASS FIBER REINFORCEMENT WITH THERMOPLASTIC RESINS

BACKGROUND OF THE INVENTION

1. Field of the Invention

The present invention relates to a process for producing composite thermoplastic sheets and component parts by resin impregnation of glass fiber mats.

2. Description of Related Art

Currently used commercial equipment and processes for production of thermoplastic sheet blanks and shaped component parts formed from such blanks suffer from several disadvantages. One known example of such processing equipment, which employs stainless steel belts to effect conductive heating and cooling of the materials, is very expensive, requiring high capital costs, and is further limited by slow heating rates. Further, glass reinforced composite sheets made with such equipment evidence voids, primarily at the fiber/resin interfaces and in the resin matrix. These voids are the major type of imperfection found in such sheets.

Elimination of voids in sheets or component parts produced from resin-impregnated glass fibers is very important in improving the mechanical properties of the sheets or parts. Voids in these composites are detrimental to the integrity and strength of the composite because fiber-polymer interfacial or interstitial voids cannot transmit a transverse load. The voids also significantly weaken the longitudinal compressive strength and interlaminar shear strength of the material. For example, a void content of 5% between the fiber and resin reduces interlaminar shear strength by 30% and longitudinal compression strength by 50%.

Known processes and equipment also suffer from the limitation that they are generally capable of producing parts only from preimpregnated sheet blanks, which in conventional flow forming processes are required to be preheated. Additionally, the production of long profiled parts such as hollow beams, tubes, corrugated panels, and the like have heretofore been produced by a process known as pultrusion, wherein generally low viscosity resins and unidirectional fiber reinforcements must be employed.

It is therefore an object of the present invention to provide an improved process for impregnating glass fibers with resins to produce composite structures or parts.

It is another object of the present invention to provide a process for impregnating glass fibers with resins to produce composite structures or parts wherein capital costs of equipment are relatively low, and the process further provides energy efficiency in operation.

It is a further object of the present invention to provide a process for manufacture of fiberglass composites employing fast heating of the materials making up the composite structures or parts, further enabling lamination of materials having a high melting point or glass transition temperature.

It is a further object of the present invention to provide a process for impregnating glass fibers with resins wherein improved adhesion between the glass fibers and the resin is attained.

SUMMARY OF THE INVENTION

The above and other objects of the present invention are accomplished by providing a process for producing composite structures wherein fast and uniform heating of the resins and glass fibers is employed for impregnation of the resin into the glass fibers, the impregnation further being conducted under vacuum conditions. The process employs one of a number of cooling methods depending upon the type of structure being produced. The fast, uniform heating is effected by using radio frequency (RF) heating to heat the materials, wherein the resin used is either inherently sensitive to RF fields or will have an RF activator ingredient added to the resin to enhance its sensitivity. Additionally, the glass fibers used advantageously have a high dielectric constant, such that the glass fibers will be quickly and efficiently heated as well.

A substantial elimination of voids in the resulting composite structure is accomplished in the present invention by conducting the impregnation process under vacuum conditions. The vacuum will act to remove entrapped air and decomposition products as the fibers are being impregnated with the resin. To this end, the glass fibers and the resin are sealed between films which are not RF sensitive, and the air is removed from the sealed space to create the vacuum.

Various cooling methods and apparatus are also suitable for use in the process of the present invention. The method and apparatus selected will largely depend on the type of composite and product desired. For example, the cooling of the resin-impregnated glass fiber may be effected by cooling on a cold flat surface at low pressure in the production of flat composite sheet material. Other cooling methods which may be employed include cooling in a mold and cooling through a die used for manufacture of shaped parts or products.

BRIEF DESCRIPTION OF THE DRAWINGS

These and other features of the present invention and the attendant advantages will be readily apparent to those having ordinary skill in the art and the invention will be more easily understood from the following detailed description of the preferred embodiments of the present invention, taken in conjunction with the accompanying drawings wherein like reference characters represent like parts throughout the several views, and wherein:

FIG. 6 is a cross-sectional view of a mold structure adapted for use in the production of large parts in accordance with the process of the present invention; and FIG. 7 is a cross-sectional view of an alternative mold structure adapted for use in the production of large parts in accordance with the process of the present invention.

DETAILED DESCRIPTION OF THE INVENTION

Figure 1B:
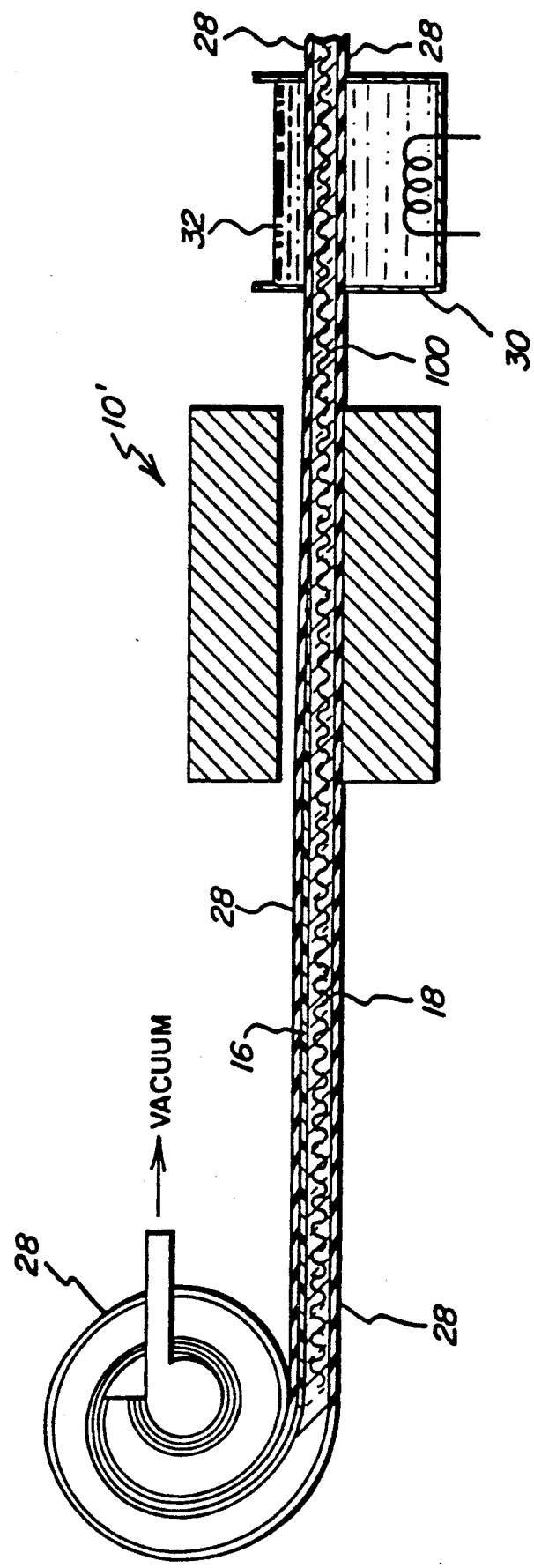
FIGS. 1 A-D are schematic representations of different embodiments of an apparatus for carrying out the process for impregnating a glass fiber mat and producing composite structures in accordance with the present invention.

Referring to the drawings, and particularly FIGS. 1A-D thereof, various features of a composite structure or parts production process and apparatus according to the present invention are shown. In FIG. 1A, a radio frequency (RF) heating apparatus 10 is depicted in substantially schematic form, and is adapted to generate an RF electromagnetic field between upper electrode or platen 12 and lower electrode or platen 14. Creation of such electromagnetic fields for use in RF heating is known in the art, and the particular features of the RF field generating means form no parts of the present invention. The electromagnetic field induces heating in materials passing through or exposed to the field which are dielectric, or non-conducting, in nature.

FIG. 1A shows a basic process wherein a resin sheet 16 laminated with a glass fiber mat 18 and the elements are passed through the RF field. While only one resin sheet 16 and one glass fiber mat 18 are depicted in the FIG. 1A process, it is to be understood that the lamination and impregnation process may be performed with any number of glass fiber mats and with one or more resin sheets interleaved with the mats, forming a stack of layers to be laminated. Glass fibers may be in the form of continuous or chopped fibers and resins may be in the form of powders.

Quick and uniform heating of the resin 16 and glass fibers in mat 18 is very important during the impregnation and is very much dependent of the temperature and the viscosity of the resin. RF heating of the materials provides this quick and uniform heating, as heat develops within the resin and fiber mass when the materials are exposed to the high frequency electromagnetic field.

The resin 16 in this process is to be heated to a temperature higher than its melting point or glass transition temperature, such that it will flow into the internal voids of the glass fiber mat 18. The resin 16 should therefore be either inherently sensitive, i.e. susceptible of being heated in an RF field, to the RF field or should have an RF activator added thereto. Examples of polymers which are sensitive to RF fields, and thus susceptible of being quickly heated, include acrylics, nylon, polyvinyl chloride, vinyl acetate, acrylonitriles, polybutylene terephthalate, polycarbonate and blends of these polymers. The precursers of these polymers which polymerize by heat are also included. Other resins which have only a low degree of RF sensitivity may have their RF sensitivity enhanced by activators such as triethanol amine, glycols, and glycerine. Some examples of inorganic materials which increase RF sensitivity include metals such as aluminum, metal oxides such as iron oxide and zinc oxide, aluminum silicates such as bentonite and clays and fly ash. Commercially available RF activators include Frequon B-20 and B-31. Frequon is a registered trademark of the Struktol Company, Stow, Ohio, for its radio frequency sensitizers comprising specially treated inorganic powders. Carbon may also be used, as it has a high RF sensitivity, but carbon possesses several disadvantages such as producing a black color and poor dispersion characteristics. Frequon B-20 and B-31 and metal oxide sensitizers have fewer problems of this type.

RF activators may also be added to those resins which have inherent RF sensitivity to further increase sensitivity. It is desirable to blend the RF activator thoroughly with the resin to ensure that the resin will be uniformly heated and to prevent hot spots from occurring. The glass fiber mat 18 is also preferably quickly heated during exposure to the high frequency electromagnetic field of RF heater 10. Therefore, it is preferable to use glass fibers possessing a high dielectric constant, such as those glasses with a high content of alkaline materials and alumina. If desired, other fibers having high dielectric constants, for example, ceramic fibers, carbon fibers and metal fibers may be included in the glass fiber mat 18 to further increase the hating rate.

As the glass fiber mat 18 and resin sheet 16 are passed through the RF heating apparatus, the resin is melted and flows into the voids in the glass fiber mat. The impregnation or saturation of the resin into the glass fiber mat may be assisted by applying pressure to the glass fiber mat 18 and resin as they are passed between the upper and lower platen 12, 14. This may advantageously be accomplished by spacing the upper platen 12 and lower platen 14 apart at a distance less than the combined thickness of the glass fiber mats and resin sheets. The structure is thus slightly compressed as it is passed between the platens.

Once the composite structure exits the electromagnetic field, the structure is cooled at low pressure to form a composite flat sheet as shown in FIG. 1A. The cooling is accomplished by passing the sheet between a pair of endless cooling belts 20, 22, disposed to travel around rollers 24, 26 which are driven by means well known in the art.

FIG. 1B depicts, in substantially schematic form, an apparatus for performing the process of the present invention which employs the further step of impregnating the glass fiber mat with resin under vacuum conditions. This process is performed by providing an encasing film 28 surrounding and sealing the space around the glass fiber mat 18 and resin sheet 16. The encasing film has a glass transition temperature and melting point higher than the bulk resin material to be passed. Examples of suitable materials for use as the encasing film include Teflon (polytetrafluoroethylene) and silicon rubber.

The vacuum condition is obtained by removing air from the space in the encasing film 28 once the film is sealed around the resin and glass fiber mat. Once the vacuum has been drawn, by well known means such as a vacuum pump, the encased resin and glass fiber mat are passed through the RF heating apparatus 10' to heat the glass fiber and melt the resin in forming a composite structure 100. The structure 100 is subsequently cooled by passing the encased structure through a tank 30 containing a cooling fluid 32 such as water, yielding a composite flat sheet end product. Cooling rollers such as those depicted in FIG. 1A may optionally be employed to cool this structure. As can also be seen in FIG. 1B, the glass fiber mat and resin layer may be fed through the RF Heater in a substantially continuous manner, for example, from a roll having the mat and resin disposed in the encasing material.

The vacuum maintained in the encasing film 28 facilitates movement of the molten resin into the internal voids of the mat, and enhances heat transfer by reducing the thickness of the glass fiber and resin mat during consolidation of the materials. Perhaps more importantly, the vacuum serves to reduce the voids in the resulting structure by removing entrapped air and decomposition products formed by the resin during the heating step of the lamination process. Improved adhesion between the glass fibers and the resin also results from this process.

In an experiment conducted in accordance with the present invention, an elastic film of 1/16 inch thick silicone rubber was found to be thermally stable at 600° F., and the silicon rubber exhibited relatively low RF sensitivity. Further, the molten resin did not adhere to the silicone rubber, and as such, silicone rubber has proven to be a suitable material for the elastic encasing film used in the production of sheets or parts formed under vacuum.

FIG. 1C depicts, in substantially schematic form, a further variation on the apparatus used to perform the process of producing composite parts in accordance with the present invention. The process as depicted in this figure provides for the lamination and impregnation of a glass fiber mat with a resin using an RF heating apparatus 10', in a manner identical to that depicted in either of FIGS. 1A or 1B. After the two materials have been heated and the resin has impregnated the glass fiber mat, the resulting composite structure 100 is transported to a mold 34, where pressure is applied by the upper and lower mold halves 36, 38 to shape the structure 100 into a desired part configuration, and the structure is cooled in the mold into this final shape. Cutting means (not shown) may be employed to cut the part once it has been shaped if the glass fiber mat and resin are being continuously processed in sheet form.

Figure 2:
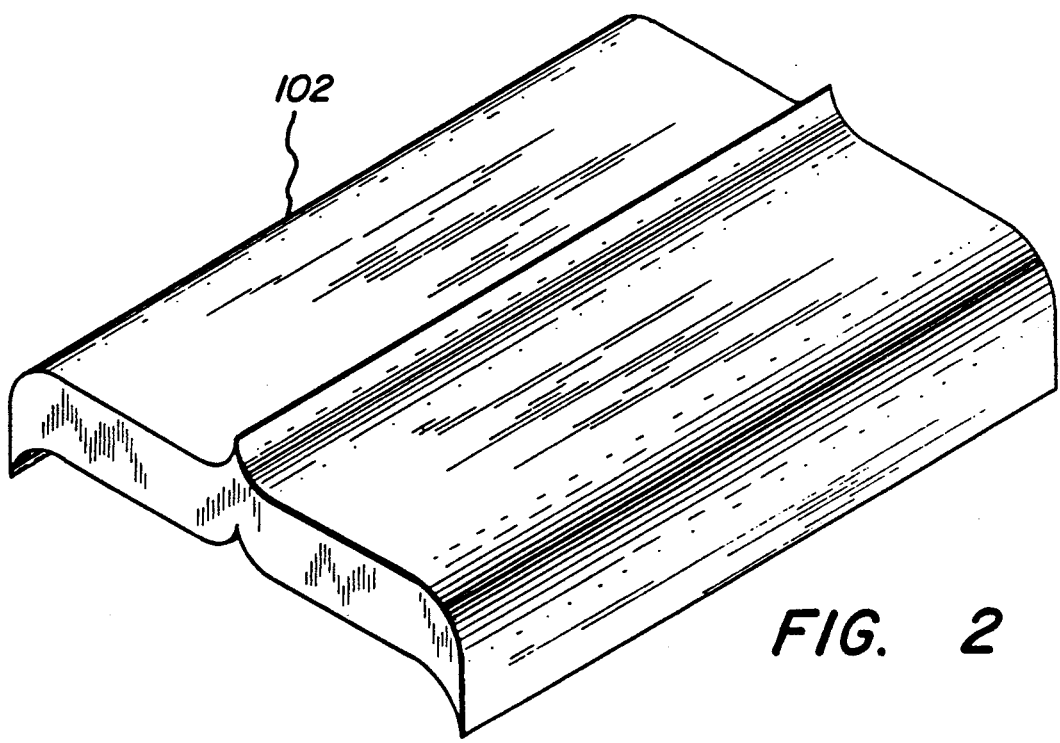
FIG. 2 is a perspective view of a molded part produced in accordance with the process of the present invention.

Providing a mold to shape the structure as it exits from the RF heater eliminates the step of reheating an impregnated glass fiber sheet blank as is required in conventional processes. FIG. 2 shows one example of a shaped part 102 which may be formed using the cooling mold process of FIG. 1C.

FIG. 1D shows, in substantially schematic form, a further variation of the apparatus used to perform the process of producing composite parts in accordance with the present invention. A glass fiber mat is laminated with a resin sheet and heated by RF heating apparatus 10' by the process depicted in either FIG. 1A or 1B, to impregnate the glass fiber mat with the resin. The heated sheet or structure 100 is passed through a die 40 comprising an upper and lower roll former 42, 44, in the example depicted in FIG. 1A.

Figure 3:
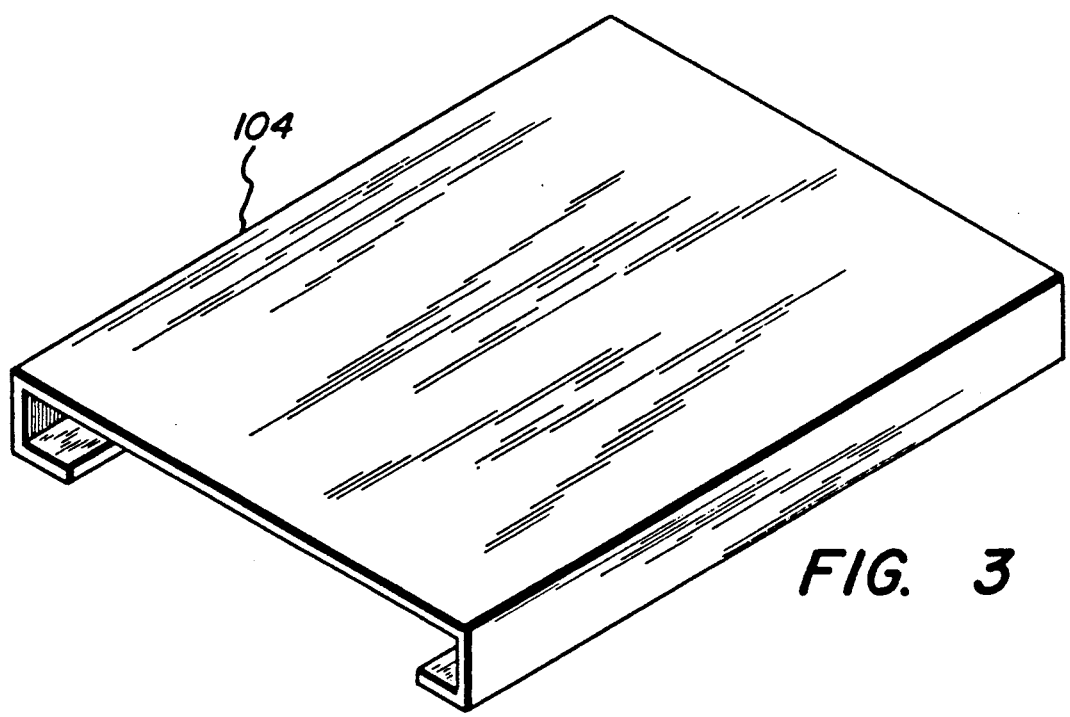
FIG. 3 is a partial perspective view of an elongated profiled part produced in accordance with the process of the present invention.

The use of a continuous process die 40 permits the continuous production of elongated, profiled parts, an example of which is the channel member 104 depicted in FIG. 3. Other examples include hollow beams, pipes, guard posts/panels, corrugated panels, and exterior body panels for trucks or buses. These and other similar parts have traditionally been produced using the pultrusion process. The process of the present invention as depicted in FIG. 1D has the advantages over pultrusion technology in that resins of various viscosities may be used and multidirectional glass fiber mats may also be employed.

The production of long profiled parts directly from glass fibers and resins may also be performed using pre-impregnated sheets. In this situation, the preimpregnated sheets are heated and then passed through cold dies to produce the parts. Smooth surface finishes of such parts may be attained by using a hot surface molding technique such as that described in U.S. patent application Ser. No. 176,117, filed Mar. 30, 1988, entitled "Compression Molding of Composite Parts on Hot Mold Surfaces with a Short Cycle Time". That application is assigned to the same assignee as the present invention.

Figure 4:
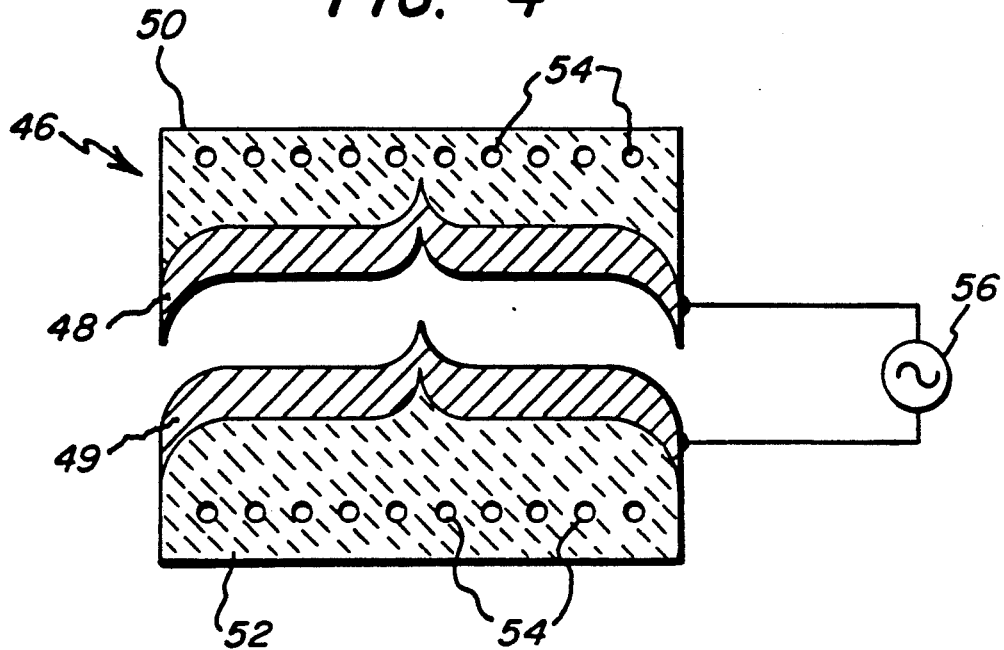
FIG. 4 is a side cross-sectional view of two mold halves designed for use in the process of the present invention.

FIGS. 4–7 depict various embodiments of an apparatus adapted to perform the process of producing composite parts in accordance with the present invention, wherein the steps of impregnation, molding and cooling of the composite structure are performed within the same mold. FIG. 4 shows a mold 46 having conductive electrodes 48, 49 placed at the surfaces of the upper and lower mold halves 50, 52, respectively. The backing for the electrodes 48, 49 is preferably made of ceramic, plastics or metals. The ceramic material is preferred because of its electrical and thermal insulation properties. The low thermal conductivity of ceramic reduces heat less during heating the resin and to provide hot mold surfaces to produce smooth surfaces. The backing material will advantageously have passages 54 extending therethrough which are adapted to carry cooling fluid when the composite structure formed therebetween is to be cooled. Power source 56, depicted schematically, is connected between the electrodes 48, 49, and is adapted to generate an RF electromagnetic field between the electrodes in a manner known in the art.

In the process of forming a composite structure or composite part using mold 46, one or more glass fiber mats and one or more sheets of resin would be layered between the upper and lower mold halves. The RF electromagnetic field is activated to melt the resin to impregnate the glass fiber mat, and the mold halves 50, 52 are moved closer together to deform the heated composite structure into the desired shape. The part is then cooled between the mold halves, either by running cooling fluid through passages 54 or other suitable means. Once the part is cooled sufficiently, the mold halves may be separated to remove the finished part.

Figure 5:
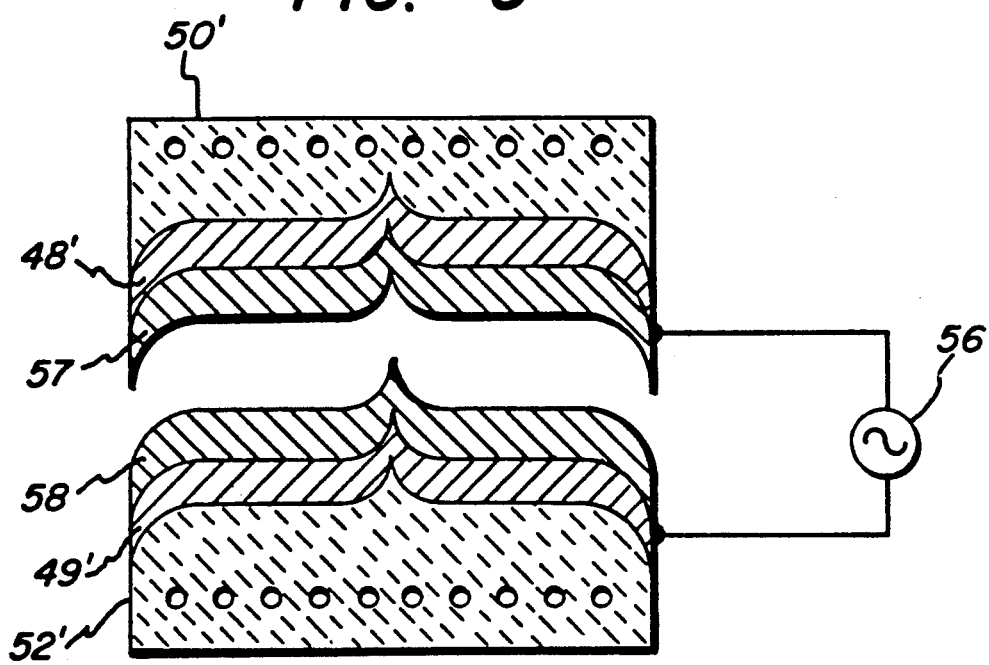
FIG. 5 is a side cross-sectional view of two mold halves designed for use in the process of the present invention.

The mold shown in FIG. 5 is similar in most respects to that shown in FIG. 4. The FIG. 5 embodiment provides a thermal insulation layer 57, 58 at the surface of upper and lower mold halves 50', 52', covering electrodes 48', 49'. These thermal insulation layers such as ceramics or plastics may advantageously be provided on the mold halves to reduce the heat loss during heating the resin and to provide hot mold surface to produce smooth surfaces. Additionally, RF activators may be added to the insulation layers 57, 58 to concentrate heat at the mold surfaces, which will enhance surface smoothness of the finished part. The process for producing composite parts using the mold of FIG. 5 will be substantially identical to that described with respect to the mold of FIG. 4.

FIGS. 6 and 7 depict two versions of an apparatus which may be used to form the impregnation, molding and cooling process of the present invention to produce large parts. The process and apparatus may advantageously be employed to produce parts such as boat hulls, canoe hulls, bathtubs, and the like.

In the FIG. 6 embodiment, a lower mold half 60 is provided, the backing portion 62 of which is preferably made of ceramic. The lower mold surface comprises lower conductive electrode 64. Lower mold half 60 has a plurality of cooling fluid channels 66 extending therethrough which are designed to be used in cooling the mold and the part once the part has been formed. An upper conductive electrode 68 is provided which is spaced apart from and extends across the electrode 64 comprising the lower mold surface. RF field generator or power source 56 is electrically connected to electrodes 64, 68, and is adapted to produce the RF electromagnetic field used to heat the materials therebetween.

A glass fiber mat 18 and a layer of resin 16 are disposed between lower mold half 60 and upper electrode 68, and a distensible sheet or film 70 is disposed on top of the glass fiber mat and resin layer, as depicted. The distensible film may advantageously be made of silicone rubber. Film 70 is of sufficient size to engage lower mold surface about the periphery thereof to seal off a space 72 between the film 70 and the lower electrode 64.

Lower mold half 60 and lower electrode 64 are preferably provided with means for evacuating air from the space 72 between the lower mold half 60 and film 70, to allow the creation of a vacuum condition. The lower mold half and lower electrode may have a plurality of small perforations (not shown) extending through to the space 72 which are in communication with an external vacuum pump.

As the RF electromagnetic field is energized heating the glass fiber mat and melting the resin to impregnate the mat, a vacuum is drawn which pulls the impregnated glass fiber mat or composite structure into contact with lower electrode 64, which is contoured to yield a part having the desired shape. The impregnated glass mat or composite structure is then cooled by deenergizing the electromagnetic field and by running cooling fluid through channels 66. Once cooled, the film 70 may be removed and the part extracted from lower mold half 60.

FIG. 7 depicts an apparatus similar to the FIG. 6 apparatus in all but one respect. In this apparatus, a smaller, moving RF electrode 74 is employed in place of fixed upper conductive electrode 68 in FIG. 6. The RF electromagnetic field is generated between the electrodes 64, 74 in this embodiment only in the region in which the moving electrode 74 is located. Moving electrode 74 is provided with means for transporting the electrode across the entire width of the lower mold half 60, as indicated by arrow A in FIG. 7. Electrode 74 may be transported either at a constant rate of travel or in discrete increments. The speed of travel is preferably set to expose the glass fiber mat and resin to the electromagnetic field for a length of time sufficient to melt the resin and to impregnate the mat.

As shown previously in the FIG. 6 apparatus, a film 70 extends across the lower mold half, and a vacuum is drawn in space 72 to remove air and decomposition gases from the glass fiber mat, and to deform the heated composite structure into the desired shape. The impregnation and deformation will occur incrementally as the moving electrode 74 locally heats the glass fiber mat and resin and is moved across the width of the lower mold half 60. The apparatus depicted and the process described with respect to FIGS. 6 and 7 may also be used to process preimpregnated sheet blanks in forming large parts of the type described.

EXAMPLE

Impregnation experiments were performed in accordance with the present invention using sheet stock made of five layers of glass fiber mats and six layers of Xenoy resins, both with and without RF activators. Xenoy is a registered trademark of the General Electric Company for a blend of bisphenol-A polycarbonate and polybutylene terephthalate. The lamination of these materials was done under vacuum, inside a sealed silicon rubber enclosure with air withdrawn. The sheets were exposed in an RF field for six minutes. This experiment was carried out to show the difference in the degree of impregnation using resins with and without RF activators. The time required for heating and impregnation can be further reduced by optimizing the potential gradient across the sheets.

The sheet stocks were inspected after this processing, and the sheet stocks having resins with RF activators evidenced good impregnation of the glass fibers with the resin. Incomplete impregnation took place in the sheet stocks in which the resins lacked the RF activators, which were exposed to the RF field for the same six-minute period.

It is to be understood and recognized that the foregoing detailed description of the invention is given merely by way of illustration, and many modifications and variations will be apparent to those skilled in the art without departing from the spirit or scope of the present invention. Therefore, the scope of the invention is to be determined by reference to the appended claims.

What is claimed is:

1. A process for forming a glass fiber composite, comprising the steps of:
    disposing a resin susceptible of being heated in a radio frequency electromagnetic filed in contact with a glass fiber mat;
    sealing the resin and the glass fiber mat within a film which has a glass transition temperature and a melting point higher than the resin;
    removing air form a space within the film to create a vacuum condition in said space; and
    exposing the resin and glass fiber mat to a radio frequency electromagnetic field for a predetermined period of time sufficient to heat the resin to its melting or glass transition temperature wherein the glass fiber mat is impregnated with the resin.

2. The process of claim 1 further comprising the step of cooling the resin-impregnated glass fiber mat to produce said glass fiber composite.

3. The process of claim 2 wherein said cooling of said composite is performed by passing said composite structure through a cooling belt apparatus having a first and second endless cooling belt adapted to receive said composite structure therebetween, and wherein said process includes the further step of removing said film from the composite structure.

4. The process of claim 2 wherein said cooling of said composite is performed by passing said composite through a tank containing a cooling fluid, and wherein said process includes the further step of removing said film from the composite structure.

5. The process of claim 2 wherein the glass fiber mat and resin are sealed within said film and the sealed glass fiber mat and resin are wound into a feed roll, and wherein the lass fiber mat, the resin layer and the sealing film are fed substantially continuously form said feed roll through said radio frequency electromagnetic field.

6. The process of claim 5 comprising the further step of forming said composite into a predetermined final shape in a mold, prior to cooling said composite structure, by pressing said composite between upper and lower mold halves, and cooling said composite prior to moving said composite from said mold.

7. The process of claim 5 comprising the further step of forming said composite into a predetermined elongated final shape, prior to cooling said composite structure, by passing said heated glass fiber mat impregnated with resin through a forming die, said die being adapted to operate in a continuous forming mode.

8. The process of claim 7 wherein said die comprises a pair of roll formers.

9. The process of claim 1 wherein said resin comprises a thermoplastic resin.

10. The process of claim 9 wherein said thermoplastic resin contains an RF activator.

11. A process for forming a glass fiber composite comprising the steps of:
    feeding a glass fiber mat having a layer of resin susceptible of being heated in a radio frequency electromagnetic field disposed thereon substantially continuously through a radio frequency electromagnetic field;
    exposing the resin and glass fiber mat to said radio frequency electromagnetic field for a predetermined period of time sufficient to heat the resin to its melting or glass transition temperature; and
    causing the heated resin to impregnate said glass fiber mat.

12. The process of claim 11 wherein said resin comprises a thermoplastic resin.

13. The process of claim 12 wherein said thermoplastic resin contains an RF activator.

14. The process of claim 11 wherein said step of causing the heated resin to impregnate said glass fiber mat is performed by creating a vacuum.

15. The process of claim 11 further comprising the step of feeding the resin-impregnated glass fiber mat through a cooling apparatus.

16. A process for producing a composite structure comprising:
    placing at least one glass fiber mat and at least one layer of RF sensitive resin between an upper electrode and a lower mold section having a mold surface comprising a lower electrode;
    disposing a polymer film which has a glass transition temperature and a melting point higher than the resin, across an upper surface of said lower mold section;
    sealing said at leas tone glass fiber mat and said at least one layer of RF-sensitive resin in a space between said lower mold section and said polymer film;
    creating a vacuum in said sealed space between said lower mold section and said polymer film;
    subjecting the at least on glass fiber mat and the at least one layer of resin to a radio frequency electromagnetic field for a predetermined period of time sufficient to heat thesin to its melting or glass transition temperature wherein said at least one glass fiber mat becomes impregnated with said resin; and
    cooling the resin-impregnated glass fiber mat to produce a composite structure.

17. The process of claim 16 wherein said lower mold section and said mold surface are adapted to permit air to be withdrawn therethrough from said sealed space.

18. The process of claim 17 wherein said upper electrode is a stationary electrode of a predetermined size wherein said at least one glass fiber mat and said at least one resin layer will be uniformly and simultaneously exposed to said electromagnetic filed.

19. The process of claim 17 wherein said upper electrode is smaller in size than said lower electrode, and said upper electrode is movable with respect to said lower electrode, and the process comprises the further step of moving said upper electrode to expose said at least one glass fiber mat and said at least one resin layer to said radio frequency electromagnetic field at only a portion of an area of the glass fiber mat at any given point in time.

20. The process of claim 16 wherein said resin comprises a thermoplastic material.

21. The process of claim 20 wherein said thermoplastic resin contains an RF activator added thereto.

22. A process for producing a composite structure comprising:
    disposing a glass fiber mat between an upper an a lower mold half;
    disposing a layer of RF-sensitive resin on said glass fiber mat;
    subjecting said resin and said glass fiber mat to a radio frequency electromagnetic field for heating the resin and fiber mat for predetermined period of time sufficient to heat the resin to its melting or glass transition temperature wherein said glass fiber mat becomes impregnated with said resin;
    moving said upper and lower mold halves toward one another to deform said glass fiber mat into a predetermined desired shape;
    cooling said resin-impregnated glass fiber mat to produce a composite structure; and
    separating said upper and lower mold halves to remove said composite structure.

23. The process of claim 22 further including the step of concentrating heat generated in the resin and fiber mat by exposure to said radio frequency electromagnetic filed at a surface of said upper or lower mold half.

24. The process of claim 22 wherein said glass fiber mat further comprises a plurality of fibers having an RF sensitivity greater than that of the glass fibers.

25. The process of claim 24 wherein said plurality of fibers comprises ceramic fibers.

* * * * *